(12) United States Patent
Ohama et al.

(10) Patent No.: US 7,764,408 B2
(45) Date of Patent: Jul. 27, 2010

(54) DOCUMENT READING APPARATUS

(75) Inventors: Takashi Ohama, Iwakura (JP); Akihiro Sakakibara, Toyota (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 560 days.

(21) Appl. No.: 11/689,969

(22) Filed: Mar. 22, 2007

(65) Prior Publication Data
US 2008/0037076 A1 Feb. 14, 2008

(30) Foreign Application Priority Data
Mar. 24, 2006 (JP) .............................. 2006-081834

(51) Int. Cl.
H04N 1/04 (2006.01)
G03G 15/00 (2006.01)

(52) U.S. Cl. ................... 358/488; 358/474; 358/486; 358/496; 358/498; 399/367; 399/372

(58) Field of Classification Search ............... 358/488, 358/486, 474, 496, 498, 461, 505; 399/367, 399/372
See application file for complete search history.

(56) References Cited

U.S. PATENT DOCUMENTS

| 5,743,522 A | 4/1998 | Rubscha et al. |
| 2004/0217537 A1 | 11/2004 | Ohama |
| 2008/0117480 A1* | 5/2008 | Huang et al. ............... 358/474 |

FOREIGN PATENT DOCUMENTS

| JP | 58111474 A | * | 7/1983 |
| JP | 6062170 A | | 3/1994 |
| JP | 10152230 A | | 6/1998 |
| JP | 11220585 A | | 8/1999 |
| JP | 2003219117 A | * | 7/2003 |
| JP | 2004299867 A | | 10/2004 |
| JP | 2005-065128 A | | 3/2005 |
| JP | 2005217509 A | | 8/2005 |

OTHER PUBLICATIONS

Japan Patent Office; Notice of Reasons for Rejection in Japanese Patent Application No. 2006-081834 (counterpart to the above-captioned U.S. patent application) mailed Apr. 4, 2009.

* cited by examiner

Primary Examiner—Cheukfan Lee
(74) Attorney, Agent, or Firm—Baker Botts, LLP.

(57) ABSTRACT

A document reading apparatus includes a document feed device configured to separate documents and to feed the documents one by one from a paper feed tray, an image reading device configured to read an image of each the documents at a reading position provided on a reading glass plate, and a document holding member arranged on a front surface side of the reading glass plate at a position opposing the image reading device. The document reading apparatus also includes a first and a second reading pattern mark provided on the document holding member at a first and second position opposing the surface of the reading glass plate, respectively. The first and second reading pattern marks have a length which is greater than a width of each of the documents. Moreover, the document reading apparatus includes a control device configured to determine the width of each of the documents by determining a first and second boundary of a left side edge and right side edge of the documents with respect to the first and second reading pattern marks when each of the documents passes over the first position and the second position.

2 Claims, 8 Drawing Sheets

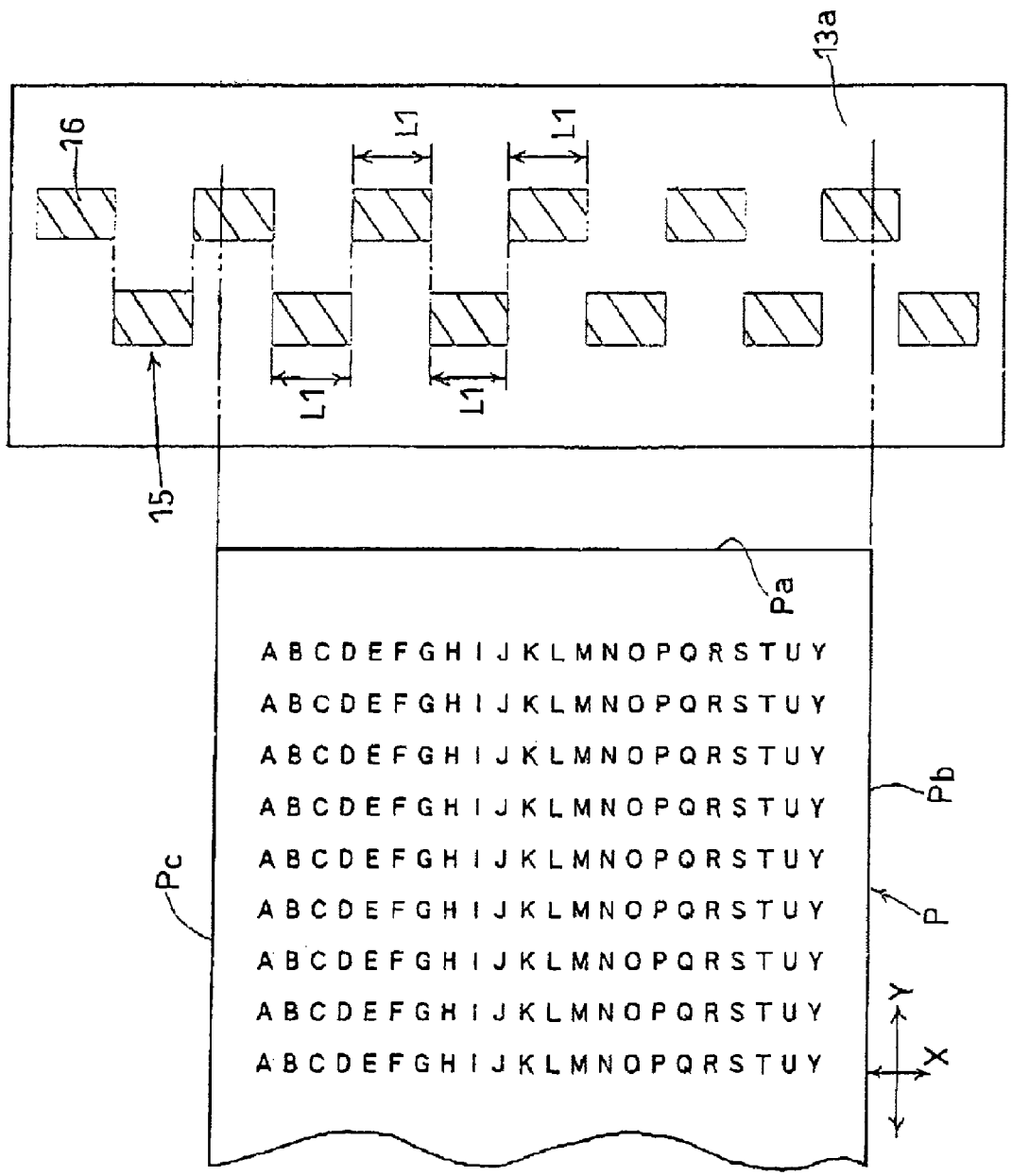

DOCUMENT READING APPARATUS

BACKGROUND OF THE INVENTION

1. Field of the Invention

The present invention relates generally to a document reading apparatus having a device which reads an image formed on a document. In particular, the present invention is directed towards a document reading apparatus having an automatic document feeding apparatus which sequentially separates a plurality of documents and reads an image from each of the documents.

2. Description of the Related Art

A known image reading apparatus, such as the image recording apparatus described in JP-A-2004-299867, includes an automatic document feeding apparatus, and a scooping guide member positioned between a transparent glass plate and an end glass plate. The known image reading apparatus also includes a reading sensor including a line CCD image pickup device which is configured to move along the lower surfaces of the transparent glass plate to position a document, such that an image may be read from the document. The known image reading apparatus further may include a contact image sensor (CIS), a paper feed tray unit, a paper discharge tray unit, a document feeding path formed therebetween, and a document feed roller positioned in the document feeding path on one side of a lid which covers the surface side of the translucent glass plate and the end glass plate.

In the known automatic document feeding apparatus, the width of the left and right side edges of the document are fed parallel to the feeding direction, and the document is not displaced sideways or fed obliquely.

In a known document reading apparatus, such as the document reading apparatus described in JP-A-2005-217509, a document is positioned on a document table having a transparent glass plate, such that a predetermined portion of the document is aligned with a document alignment mark, and the image is opposed to the document table. The known document reading apparatus includes a document holding panel for holding the document, and the image is read by a reading sensor, such as a contact image sensor or a CCD, which moves under surface of the glass plate in a predetermined scanning direction.

In the known document reading apparatus, a document holding surface of the document holding plate has a regularly repeating pattern, such as a grill pattern, such that an image processing device processes the document positioned on the glass plate and the repeating pattern as data, recognizes a portion of the repeating pattern which is hidden behind the document on the basis of the data, whereby the size, the position, and the inclination of the document is detected by a document detection device.

Nevertheless, when the configuration described in JP-A-2005-217509 is applied to the image reading unit for reading the image on the document fed by the automatic document feeding apparatus having the configuration described in JP-A-2004-299867, the width of the document may not be accurately detected.

Specifically, in JP-A-2005-217509, the reading sensor is stationary at a document reading position of the end glass plate on the lower surface side, and the document to be read moves with respect to the reading sensor. Therefore, when the document being fed has the same repeated pattern, e.g., solid black, on both side edges thereof, as the repeated pattern at the document reading position on the back surface side of the document and the corresponding portion of the document pass through the reading position, the reading sensor may not read and detect the accurate width of the document.

SUMMARY OF THE INVENTION

Therefore, a need has arisen for multifunction devices which overcome these and other shortcomings of the related art. A technical advantage of the present invention is that a single image reading device is sufficient, and a sensor for detecting the width of the documents need not be employed, which reduces manufacturing costs.

According to an embodiment of the present invention, a document reading apparatus comprises a document feed device configured to separate documents and to feed the documents one by one from a paper feed tray, and an image reading device configured to read an image of each the documents at a reading position provided on a reading glass plate. The document reading apparatus also comprises a document feeding path formed between the paper feed tray and a paper discharge tray, in which each of the documents are fed in a feeding direction from the paper feed tray to the paper discharge tray via the reading position, and a document holding member arranged on a front surface side of the reading glass plate at a position opposing the image reading device. Moreover, the document reading apparatus comprises a first reading pattern mark provided on the document holding member at a first position opposing the surface of the reading glass plate, and a second reading pattern mark provided on the document holding member at a second position opposing the surface of the reading glass plate. The first position is different than the second position, the first reading pattern mark comprises a first form, and the second reading pattern mark comprises a second form which is different than the first form. In addition, the first reading pattern mark has a first length and the second reading pattern mark has a second length, and each of the first length and the second length is greater than a width of each of the documents. The document reading apparatus further comprises a control device configured to determine the width of each of the documents by determining a first boundary of a left side edge of each of the documents and a second boundary of a right side edge of each of the documents with respect to the first reading pattern mark and the second reading pattern mark in the primary scanning direction when each of the documents passes over the first position and the second position.

According to another embodiment of the present invention, a document reading apparatus comprises a document holding member, and a first reading pattern mark provided on the document holding member at a first position. The first reading pattern mark comprises a first form. The document reading apparatus also comprises a second reading pattern mark provided on the document holding member at a second position which is different than the first position. The second reading pattern mark comprises a second form which is different than the first form. Moreover, the document reading apparatus comprises a control device configured to determine a width of a document by sensing a first side edge boundary and a second side edge boundary of the document with respect to the first reading pattern mark and the second reading pattern mark when the document passes over the first reading pattern mark and the second reading pattern mark, respectively.

Other objects, features, and advantages will be apparent to persons of ordinary skill in the art from the following detailed description of the invention and the accompanying drawings.

BRIEF DESCRIPTION OF THE DRAWINGS

For a more complete understanding of the present invention, the needs satisfied thereby, and the features and technical advantages thereof, reference now is made to the following descriptions taken in connection with the accompanying drawings.

FIG. 8 is a drawing showing another embodiment of the first and second reading pattern marks.

DETAILED DESCRIPTION OF EMBODIMENTS

Embodiments of the present invention and their features and technical advantages may be understood by referring to FIGS. 1-8, like numerals being used for like corresponding portions in the various drawings.

Figure 1:
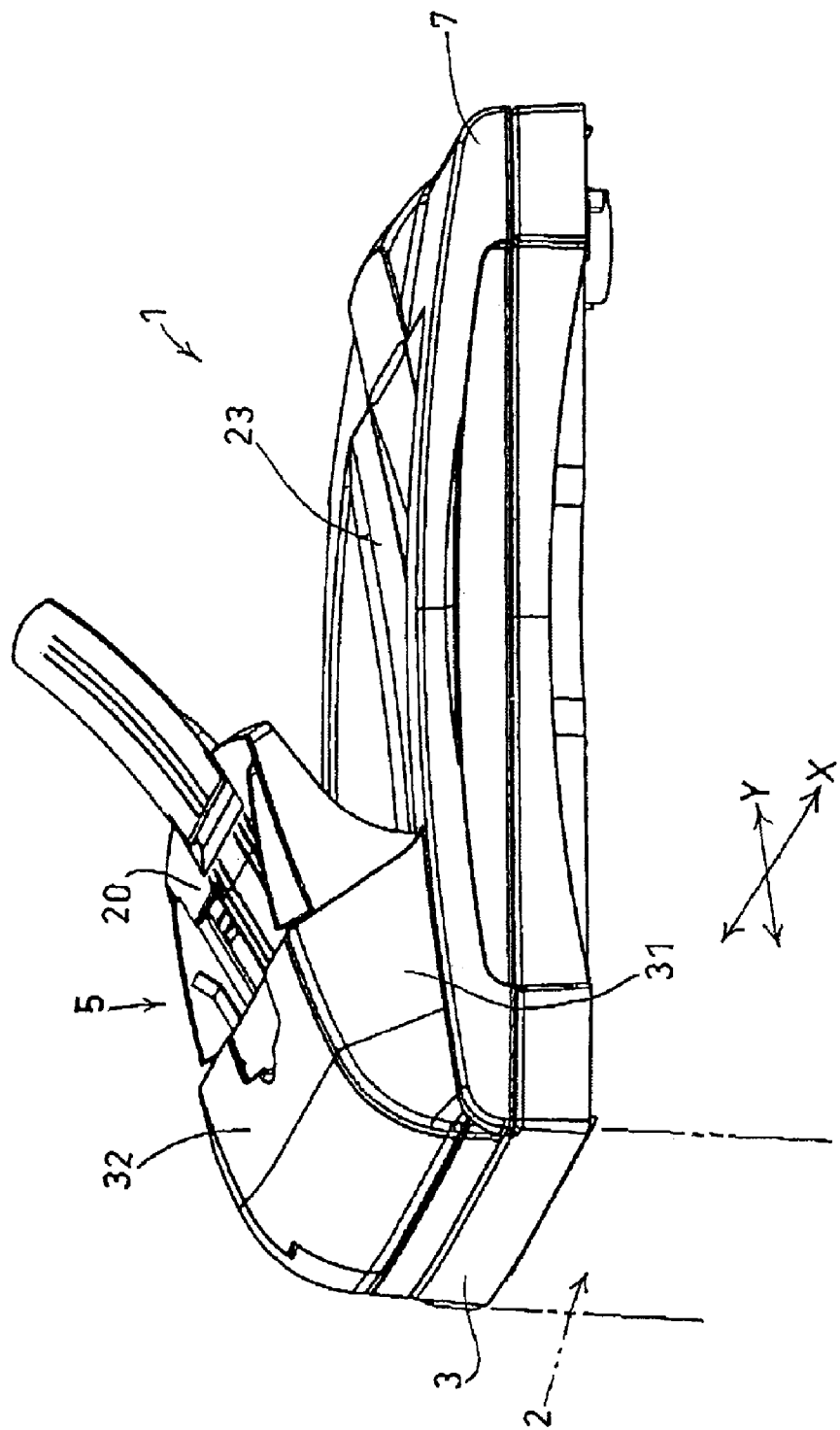
FIG. 1 is a perspective view of a document reading apparatus, according to an embodiment of the present invention.
Figure 2:
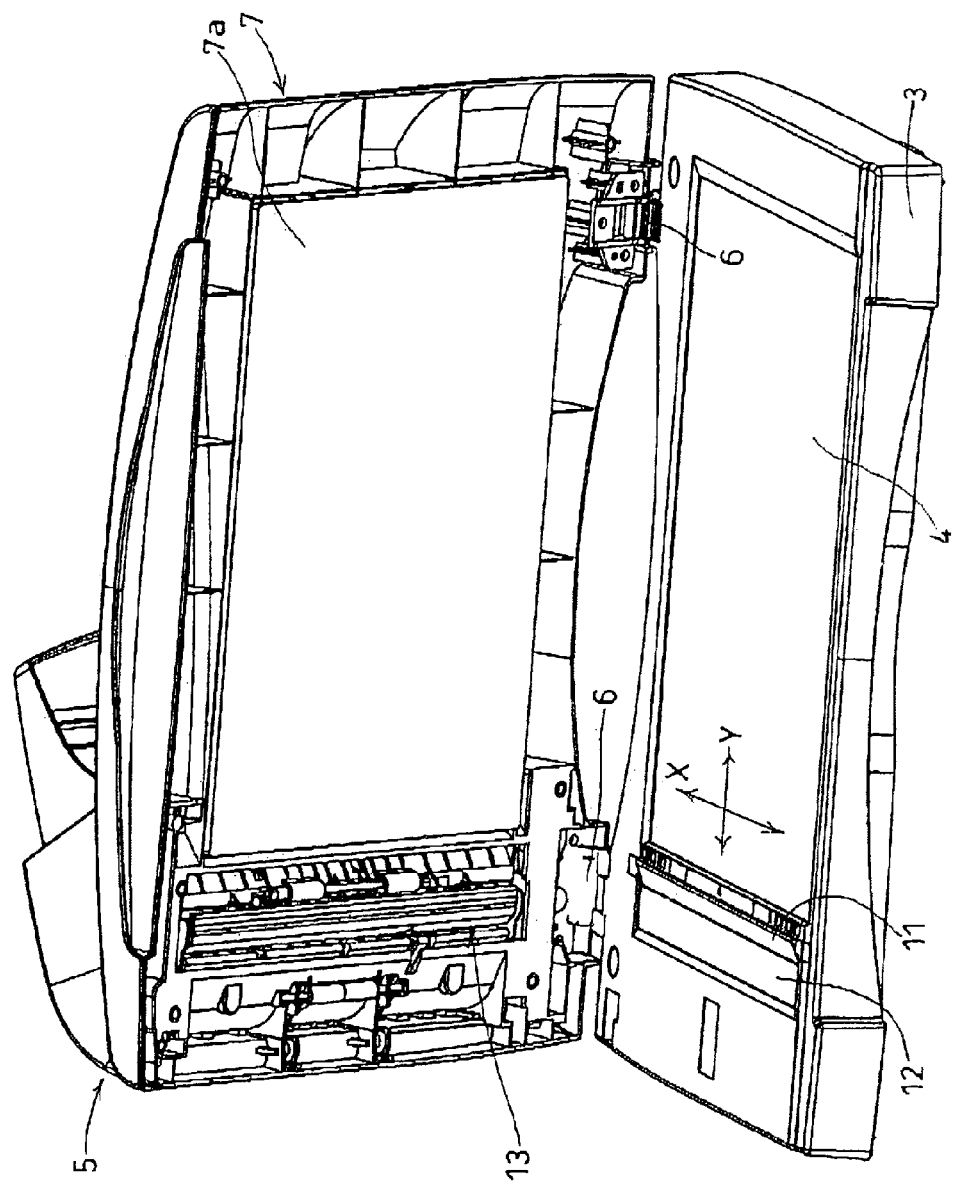
FIG. 2 is a perspective view of the document reading apparatus of FIG. 1, in which a lid member is open.
Figure 3:
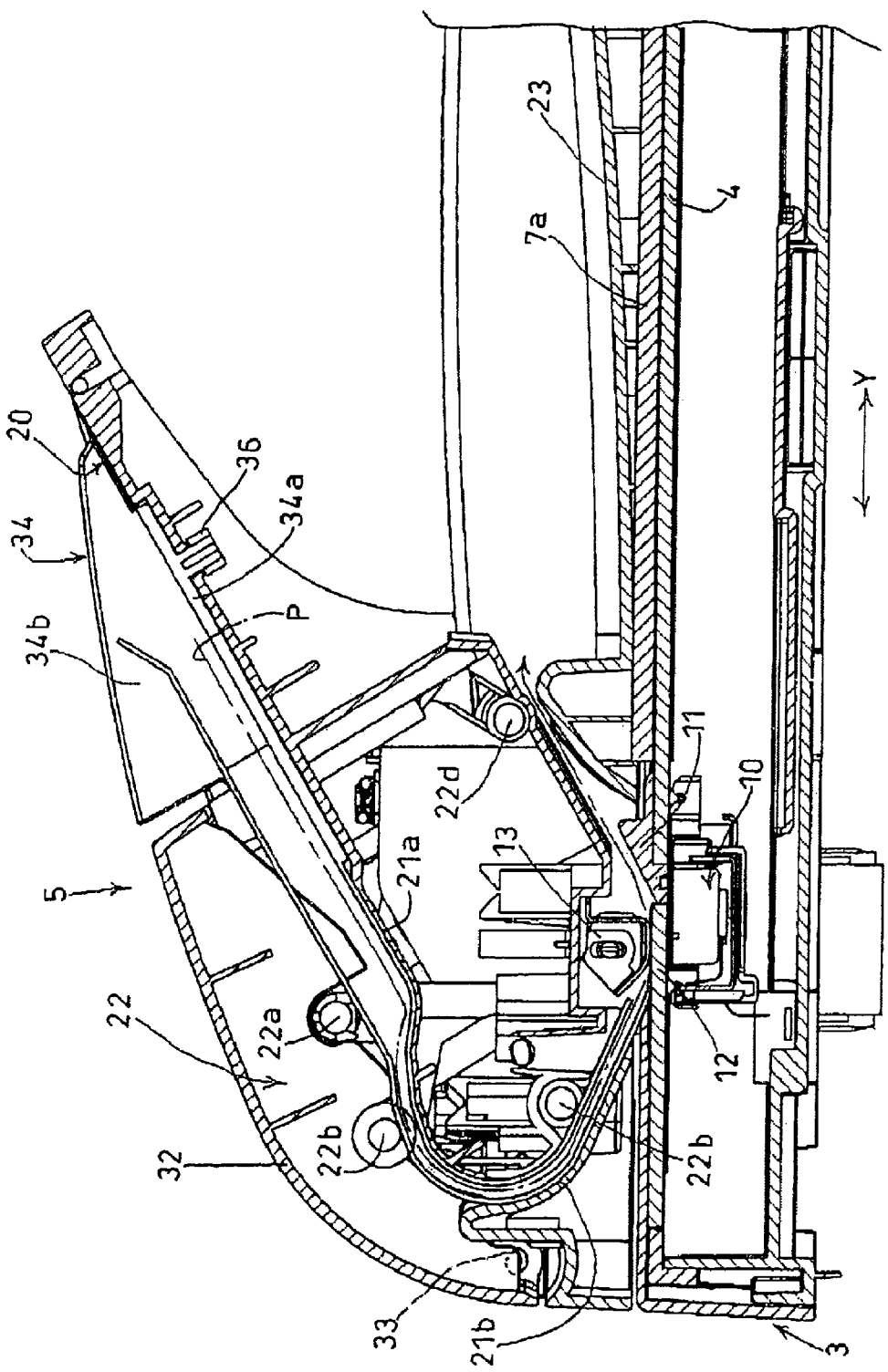
FIG. 3 is a cross-sectional side view of a portion of the document reading apparatus of FIG. 1.

Referring to FIGS. 1-3, a reading apparatus 1 may be mounted to a housing 2 of a multi-functional machine which may perform a plurality of functions, e.g., a facsimile function, a scanner function, a copying function and a printing function. In an embodiment, a transparent and stationary image reading glass plate 4 for reading the document, a scooping guide member 11, and a passing image reading glass plate 12 may be fixed horizontally on the upper surface of a body case 3 of the image reading apparatus 1.

A cover member 7 may be attached to the rear edge of the upper surface of the body case 3 via a hinge 6, and may be configured to rotate in the vertical direction, and an automatic document feeding apparatus 5 may be provided on one side of the upper surface of the cover member 7. The automatic document feeding apparatus 5 may comprise a paper feed tray unit 20, a feeding path 21, e.g., a U-shaped feeding path, having a document feed device 22, such as a feed roller, a document holding member 13 for bringing an image on a fed document P closer to the surface of the passing image reading glass plate 12, and a paper discharge tray unit 23. In operation, after the image is read from the document P, the document is discharged and stacked.

Figure 4B:
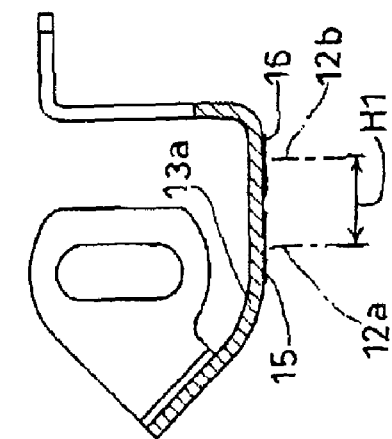
FIG. 4B is an enlarged cross-sectional side view of a portion of the document reading apparatus of FIG. 1 showing positions of first and second reading pattern marks on a lower surface panel of a document holding member.
Figure 4A:
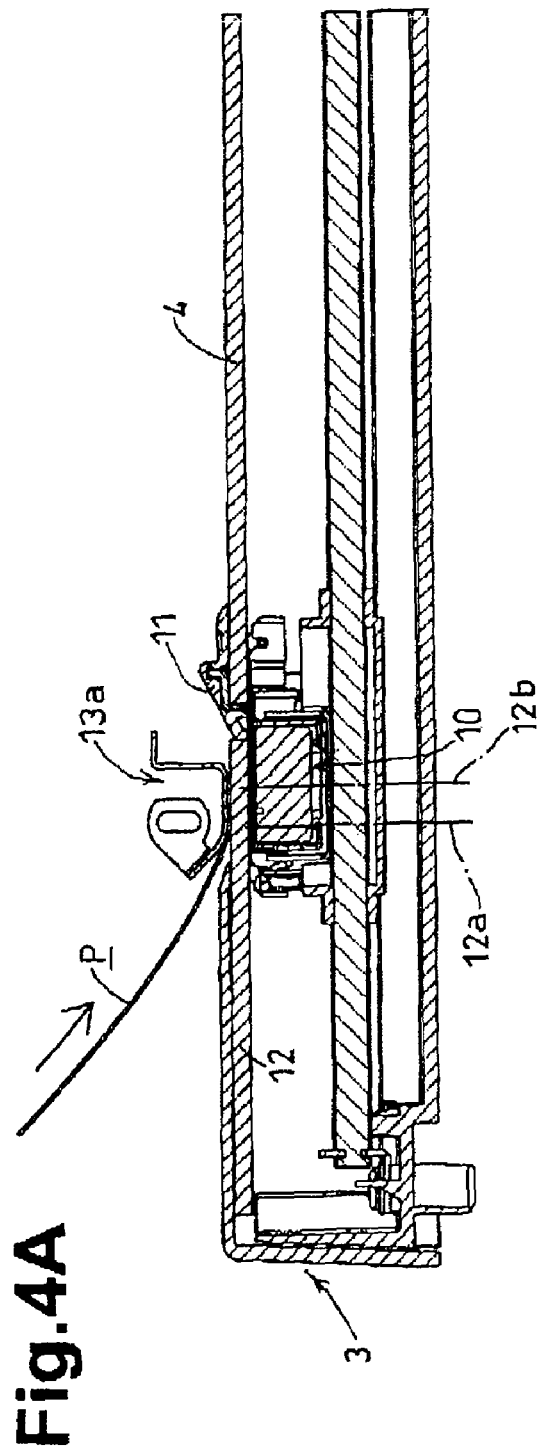
FIG. 4A is a cross-sectional, side view of a portion of the document reading apparatus of FIG. 1 showing a passing document reading glass plate.

An image reading device 10, e.g., a Line Contact Image Sensor ("CIS") for performing the scanning function reciprocate along the Y-axis direction, e.g., the feeding direction, in FIG. 2 and FIG. 4 on the lower surface side of the stationary image reading glass plate 4 and the passing image reading glass plate 12. The image reading device 10 may be positioned longitudinally along the X-axis direction in FIGS. 2 and 4, e.g., the primary scanning direction, which is orthogonal to the feeding direction of the document P, and is configured to read an image over a longer range than the maximum width of the document P. The image reading device 10 is configured to selectively stop at a first passing image reading position 12a and a second passing image reading position 12b. The image reading device 10 may be a line CCD image pickup device.

Figure 6:
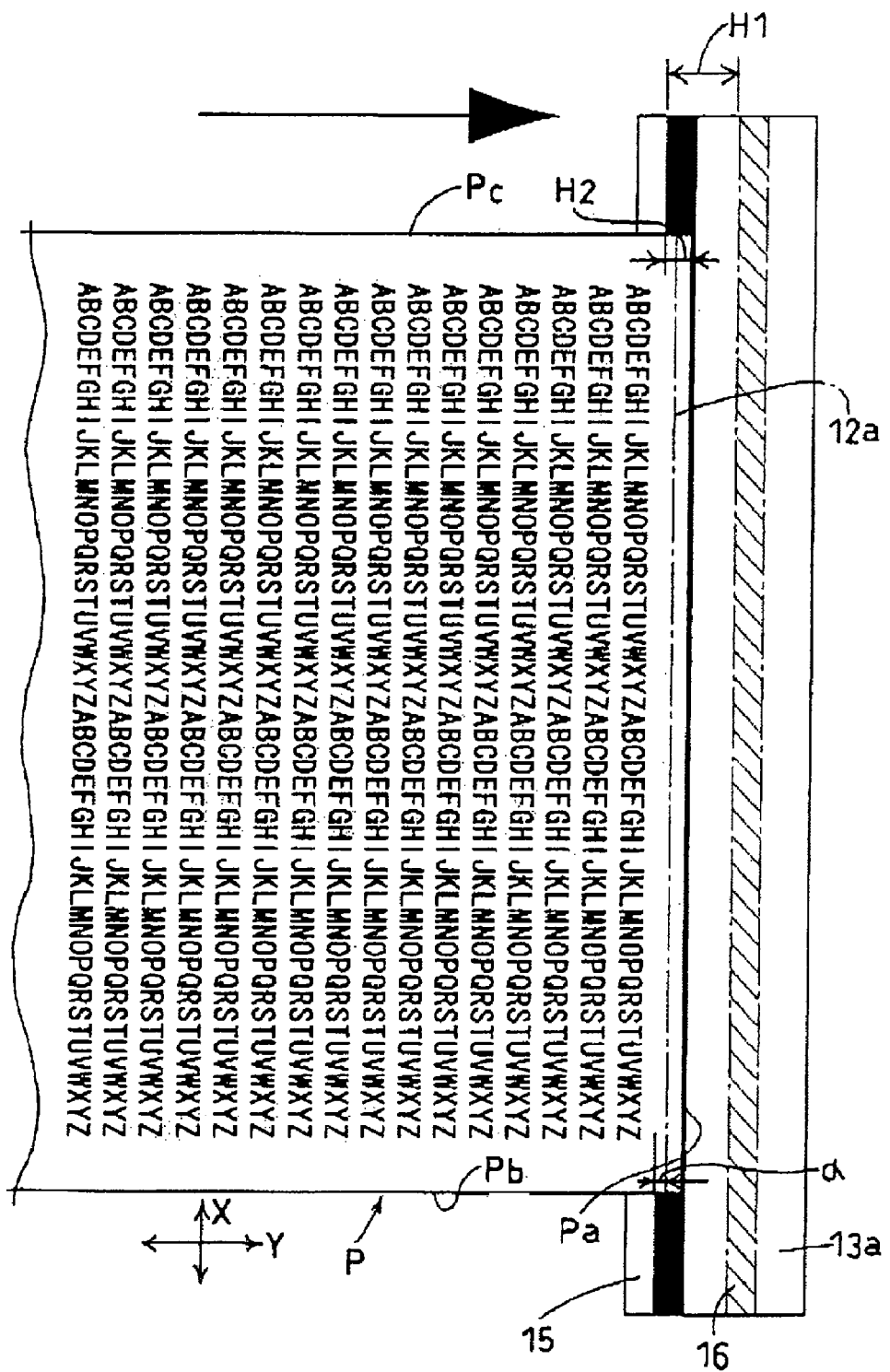
FIG. 6 is a drawing showing a state of reading at the position of a first reading pattern mark.
Figure 7:
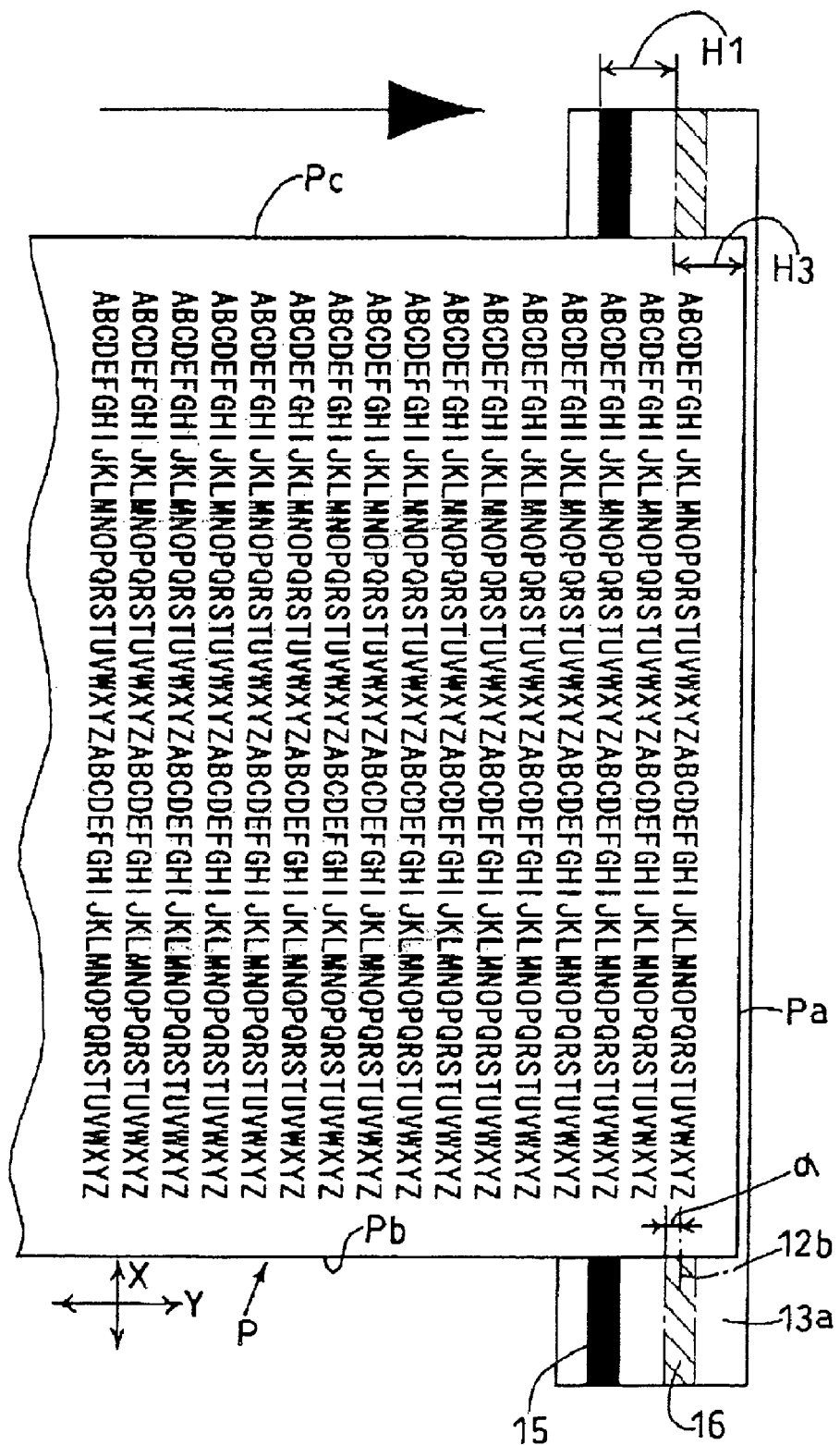
FIG. 7 is a drawing showing a state of reading at the position of a second reading pattern mark.

The lower surface of the document holding member 13, e.g., a lower surface panel 13a, may oppose a detection surface of the image reading device 10, and may be arranged in parallel to the longitudinal direction, e.g., the primary scanning direction, of the detection surface of the image reading device 10, so as to have substantially the same length. Referring to FIGS. 4B, 6, and 7, a first reading pattern mark 15 may be formed on the lower surface panel 13a of the document holding member 13 at a position opposing the first passing image reading position 12a of the image reading device 10. The first reading pattern mark 15 may extend along the primary scanning direction over a range which is longer than the maximum width of the document P. Similarly, a second reading pattern mark may be provided in parallel to the first passing image reading position 12a at a predetermined distance H1 on the downstream side of the feeding direction, and at a position opposing the second passing image reading position 12b. The second reading pattern mark 16 may extend along the primary scanning direction over a range which is longer than the maximum width of the document P. In an embodiment, the lower surface panel 13a may comprise a metal plate having a smooth surface with a low coefficient of friction, on which a white film may be adhered. When the document holding member 13 comprises a material which is white and has a smooth surface with a low coefficient of friction, the first reading pattern mark 15 and the second reading pattern mark 16 may be printed on the lower surface of the document holding member 13, or a tape on which the first reading pattern mark 15 and the second reading pattern mark 16 are printed may be adhered thereto.

The first reading pattern mark 15 and the second reading pattern mark 16 may have different forms at the same position in the primary scanning direction. For example, referring to FIGS. 6 and 7, the first reading pattern mark 15 may be a continuous band-shaped black mark extending in the X-axis direction, and the second reading pattern mark 16 may be a continuous band-shaped white mark extending in the X-axis direction When both of the marks 15 and 16 are continuous band-shaped patterns, they may be differentiated solely by color. Nevertheless, colors which are the same as a light-receiving filter of the CCD and LEDs of the CIS in the image reading device 10 may not used because these colors may hinder the determination of the color of the marks. In another embodiment, both of the marks 15 and 16 may have a pattern continuing in the X-axis direction, such as a wave pattern or a flowing whirl pattern and may be differentiated by color. Therefore, the form of the marks 15 and 16 may correspond to a band or a pattern continuing in the primary scanning direction with a color, including white and black, added thereto, or bands or patterns arranged at a predetermined distance in the primary scanning direction with a color, including white and black, added thereto.

When the document P passes through the positions corresponding to the first reading pattern mark 15 and the second reading pattern mark 16, the image reading device 10 reads left to right width edges Pb and Pc of the document P, the first reading pattern mark 15, and the second reading pattern mark 16. Moreover, referring to FIG. 5, a control device 40 may cause an image processing apparatus to sense boundaries of the left and right width edges Pb and Pc of the document P, the first reading pattern mark 15, and the second reading pattern mark 16 in the primary scanning direction from the read data, to detect the width of the document.

In this embodiment, positions downstream of the feeding direction from edges of the first reading pattern mark 15 and the second reading pattern mark 16 on the upstream side in the document feeding direction by a dimension ☐ may correspond to the first passing image reading position 12a and the second passing image reading position 12b read by the image reading device 10. Moreover, referring to FIGS. 6 and 7, may move the image reading device 10 in the Y-axis direction when a leading edge Pa of the fed document P is carried from the first passing image reading position 12a and second passing image reading position 12b, respectively toward the downstream of the feeding direction by a predetermined distance, images of the left and right width edges Pb and Pc of the document P may be picked up together with the first reading pattern mark 15 or the second reading pattern mark 16.

A document feed device 22 may be arranged on one side of the upper surface of the cover member 7. The document P fed from the paper feed tray unit 20 may be fed by the document feed device 22, the image on the document P may be read by the image reading device 10 which may be stationary on the lower surface side of the passing image reading glass plate 12 at the first passing image reading position 12a and second passing image reading position 12b. The image reading device 10 then may be moved to a document reading position on the downstream side of the second passing image reading position 12b in the document feeding direction, and may read the image of the document. The fed document P may be discharged to the paper discharge tray unit 23 after having been scooped at the position of the scooping guide member 11 immediately after the document reading position. When the second reading pattern mark 16 is white, the position of the second reading pattern mark 16 may be used as the document reading position.

In this embodiment, a portion of the stationary image reading glass plate 4 having may correspond to a flat-bed reading section for reading the image of the document positioned on the glass plate 4 face down. Therefore, a holding member 7a comprise a sponge and a white board for holding the document on the stationary image reading glass plate 4. Moreover, the image may also be read with the image reading device 10 being moved along the guide rails (not shown) arranged on the lower surface of the still image reading glass plate 4 in a state in which the document is held by the holding member 7a upon reception of an image reading instruction.

A case member 31 of the automatic document feeding apparatus 5 may be fixed to an end of the cover member 7, the paper feed tray unit 20 may be arranged at an end of the case member 31 obliquely with the free end thereof positioned at a higher level and the position attached to the case member 31 positioned at a lower level, and the documents P may be stacked thereon with the images facing upwards. Referring to FIGS. 1 and 4, the paper discharge tray unit 23 may be positioned on the upper surface of the cover member 7 below the paper feed tray unit 20.

Figure 5:
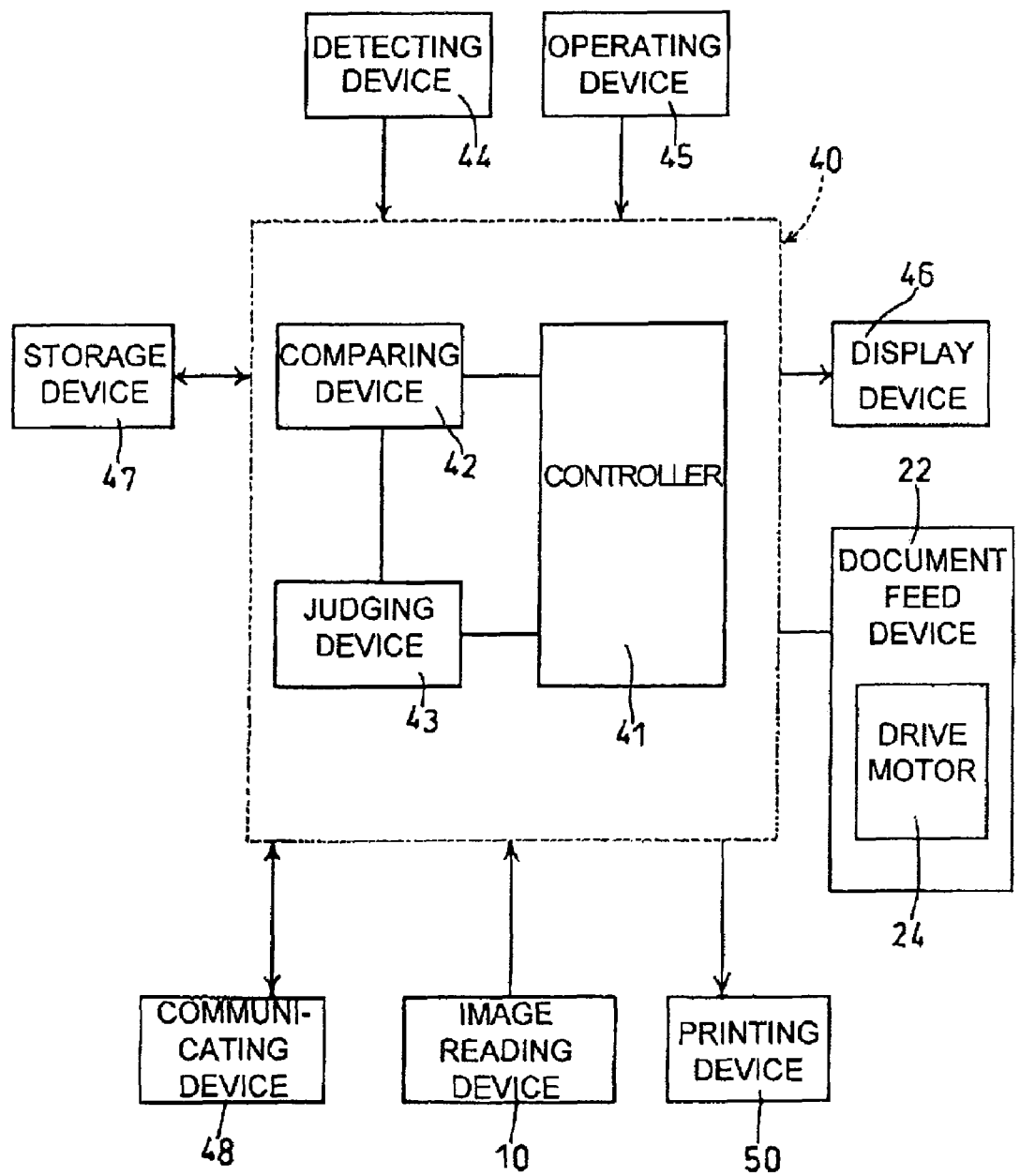
FIG. 5 is a functional block pattern of a control device, according to an embodiment of the present invention.

Referring to FIG. 3, the document feed device 22 may comprise a plurality of drive rollers 22a, 22b, 22c, and 22d which feed the document in the feeding path 21 and may read one side of the document P fed from the paper feed tray unit 20 at a passing document reading position 4a and may discharge the same. Referring to FIG. 5, the drive rollers 22a, 22b, 22c, and 22d are driven to rotate by a drive motor 24. The drive roller 22a which is located at a position closest to the paper feed tray unit 20 opposes a friction member (not shown) for separating the documents one by one, and may sequentially feed the plurality of documents P stacked in the paper feed tray unit 20 into the feed path 21. Moreover, driven rollers (not shown) may oppose the respective drive rollers 22b, 22c, and 22d.

Referring to FIG. 3, the feeding path 21 may comprise an inner plate 21a which may have a substantially U-shape in a side view continued from the paper feed tray unit 20, and an outer plate 21b arranged radially on the outside of the inner plate 21a at a predetermined distance. The inner plate 21a may be integral with the paper discharge tray unit 23. The outer plate 21b may be integral with the inner side of a rotating cover member 32 which covers the upper side of the case member 31. The lower end of the rotating cover member 32 may be connected to the side end of the case member 31, and may be configured to rotate in the vertical direction about a pivotal portion 33. Therefore, by opening the rotating cover member 32, a document P jammed at a portion in the feeding path 21 may be removed, a document P which is jammed at the position of the passing image reading glass plate 12 may be removed.

A pair of document guide members 34 which abut and guide the left and right side edges of the stacked document P extending in parallel with the feeding direction may be positioned on the upper surface of the paper feed tray unit 20, and may be movable in the widthwise direction of the document P. For example, the pair of left and right document guide members 34 may have an L-shaped cross-section, and may comprise a bottom plate 34a, a side limit strip 34b extending upright in the vertical direction therefrom, and a rack member (not shown) extending in the widthwise direction of the document P from the bottom plate 34a. The respective rack members may comprise rack portions which oppose each other. Referring to FIG. 3, the pair of rack portions may mesh with pinion gears 36 rotatably provided on the paper feed tray unit 20. Accordingly, when one of the side limit strips 34b is moved by a user in the widthwise direction of the document P, the other side limit strip 34b moves simultaneously, such that the distance may be freely adjusted about the widthwise center of the document P positioned on the upper surface of the paper feed tray unit 20.

Referring to FIG. 5, the control device 40 may comprise the image reading device 10, a comparing device 42, a controller 41, a judging device 43, a detecting device 44, an operating device 45, a display device 46, a storage device 47, a communicating device 48, and a printing device 50 such as a printer unit. The comparing device 42, the controller 41, and the determination device 43 comprise a CPU. The storage device 47 may comprise a semiconductor memory and a hard disk for temporarily storing various control programs, various data computed via the CPU, and read or received image data. The detecting device 44 may comprise a paper sensor with a sensing lever for detecting the presence or the absence of paper feed or the length of the document. The operating device 45 may comprise button keys provided on an operation panel unit of the multi-functional machine, and the display device 46 may comprise a liquid crystal panel provided on the operation panel unit. The control device 40 controls the drive of the drive motor 24 in the document feed device 22, and may be connected to the communicating device 48 for connecting a telephone line or the printing device 50. Data for identifying the first reading pattern mark 15 and the second reading pattern mark 16 may stored in the storage device 47 as control data.

In the following exemplary description of a control for identifying the width of the document P when reading the documents fed by automatic paper feeding, the first reading pattern mark 15 is black and is a running pattern mark in the shape of a continuous band extending in the X-axis direction, and the second reading pattern mark 16 is white and is a running pattern mark in the shape of a continuous band extending in the X-axis direction.

When a document reading command is entered, the documents P stacked in the paper feed tray unit 20 are separated and fed one by one into the feeding path 21. Referring to FIG. 6, when the leading edge Pa of the document P being fed is moved by a predetermined distance from the first passing image reading position 12a of the first reading pattern mark 15, e.g., when the leading edge Pa of the document P being fed is moved by a predetermined distance H2 from the edge of the first reading pattern mark 15 on the upstream side of the feeding direction, feeding of the document P is stopped. The image reading device 10 then sequentially reads the image data from the side of both ends of the first reading pattern mark 15 in the longitudinal direction toward the widthwise center of the document P.

When the image data is scanned and read in sequence from the outsides of the pair of left and right side edges Pb and Pc in the widthwise direction of the document P toward the widthwise center, the image reading device 10 identifies the running pattern in the shape of the continuous band of the first reading pattern mark 15 on the outsides of the pair of left and right side edges Pb and Pc, and when the image reading device 10 enters the widthwise inside of the document P beyond the boundaries of the pair of left and right side edges Pb and Pc, the image reading device 10 identifies only the base color, e.g., white, of the document P. Therefore, the boundaries may be judged from the difference of the image data therebetween by the image processing. The judging operation may be carried out relatively quickly. For example, the image reading device 10 scans the document P from the widthwise center toward the pair of left and right side edges Pb and Pc, if characters are written on arbitrary positions in the widthwise direction of the document P e.g., are written in black, the image reading device 10 sequentially reads the black and white dot data in the corresponding scanning direction, and then reads the image data of the first reading pattern mark 15 for a first time when it passes over the pair of left and right side edges Pb and Pc after continuous white areas in the vicinity of the pair of left and right side edges P and, Pc. Therefore, additional time is necessary for the scanning and image processing of the character portion. Nevertheless, when the image data is read from the outsides which sandwich the pair of left and right side edges Pb and Pc in the widthwise direction of the document P, as in this embodiment, the image processing of the image data of the running pattern of the first reading pattern mark 15 is achieved more quickly.

Referring to FIG. 7, when the image data of the first reading pattern mark 15 is read, the document P is fed and then is again stopped when the leading edge Pa of the document P is moved by a predetermined distance from the second passing image reading position 12b of the second reading pattern mark 16, e.g., when the leading edge Pa of the document P is moved by a predetermined distance H3 from the upstream edge in the feeding direction of the second reading pattern mark 16. Simultaneously, the image reading device 10 also may be moved to a position opposing the second reading pattern mark 16. When the image data is scanned and sequentially read from the outsides of the pair of widthwise left and right side edges Pb and Pc of the document P again toward the widthwise center in this state, the image reading device 10 may identify the running pattern in the shape of a continuous band of the second reading pattern mark 16 on the outsides of the pair of left and right side edges Pb and Pc, and may identify only the base color e.g., white, of the document P when it passes over the boundaries of the pair of left and right side edges Pb and Pc and reaches the widthwise inside the document P. Then, the boundaries may be determined from the difference in the image data therebetween by the image processing.

Subsequently, the positions of the pair of left and right side edges Pb and Pc obtained from the image data processing of the first and second reading pattern marks 15 and 16 are compared, and the width of the document P is determined. For example, when the positions of the pair of left and right side edges Pb and Pc on the first reading pattern mark 15 are represented by Pb1 and Pc1 respectively, and the positions of the pair of left and right side edges Pb and Pc on the second reading pattern mark 16 are represented by Pb2 and Pc2 respectively, and if Pb1 is determined to be the outermost in the X-axis direction by the comparison between Pb1 and Pb2, and Pc2 is found to be the outermost in the X-axis direction by the comparison between Pc1 and Pc2, the distance between Pb1 and Pc2 is defined as the width of the document P.

The form of the running pattern mark, e.g., color, maybe differentiated between the first reading pattern mark 15 and the second reading pattern mark 16 in order to make the identification possible by one of the first reading pattern mark 15 and second reading pattern mark 16, even when the base color of the document P is the same as the color of the other running pattern mark, such that the positions (boundaries) of the pair of left and right side edges Pb and Pc in the primary scanning direction may be determined. Therefore, even though the document P may be a white document, the first reading pattern mark 15 is black and is a running pattern mark in the shape of a continuous band extending in the X-axis direction, and consequently, the second reading pattern mark 16 which is white and is a running pattern mark in the shape of a continuous band extending in the X-axis direction, may be employed.

When there is an end mark of a black square shape provided in a small area including one of the pair of left and right side edges Pb and Pc of the document P, for example, the side edge Pb, the boundary of the side edge Pb may not be judged by the first reading pattern mark 15 of the black continuous band shape, but nevertheless, may be judged by the second reading pattern mark 16, which is white and has the shape of a continuous band extending in the X-axis direction.

Moreover, when the first reading pattern mark 15 and the second reading pattern mark 16 are set to be running patterns of, for example, wave shape having different phases or different pitches, even though there are provided running patterns of wave shape on the document P in the areas including the pair of left and right side edges Pb and Pc, the patterns on the document P generally do continue to the continuous wave patterns of the first and second reading pattern marks 15 and 16 at the same phase or pitch. Therefore, even though the first reading pattern mark 15 and the second reading pattern mark 16 have the form of the running pattern of wave shape, judgment of the boundaries of the pair of left and right side edges Pb and Pc of the document P may be achieved.

FIG. 8 shows another embodiment. In this embodiment, the first reading pattern mark 15 and the second reading pattern mark 16 have different colors, and are arranged in an alternating pattern in the primary scanning direction. More specifically, the first and second reading pattern marks 15 and 16 have areas of rectangular shape, and the length of the area in the X-axis direction and the distance of arrangement are the same LI. The first and second reading pattern marks 15 and 16 are shifted from each other in the X-axis direction by LI, and the first and second reading pattern marks 15 and 16 are different in color. Moreover, the positions (boundaries) of the pair of left and right side edges Pb and Pc of the document P in the primary scanning direction may be identified by either one of the first and second reading pattern marks 15 and 16.

In the invention, the image reading device 10 is configured to move to pick up images of the first reading pattern mark 15 or the second reading pattern mark 16, and predetermined portions when the predetermined portions of the fed document P from the leading edge Pa along the feeding direction reach the first reading pattern mark 15 and the second reading pattern mark 16, respectively. Therefore, a single image reading device 10 is sufficient, and a sensor for detecting the width of the document P need not be employed, which reduces manufacturing costs.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the flowing claims.

What is claimed is:

1. A document reading apparatus comprising:
   a document feed device configured to separate documents and to feed the documents one by one from a paper feed tray;
   an image reading device configured to read an image of each the documents at a reading position provided on a reading glass plate;
   a document feeding path formed between the paper feed tray and a paper discharge tray, in which each of the documents is fed in a feeding direction from the paper feed tray to the paper discharge tray via the reading position;
   a document holding member arranged on a front surface side of the reading glass plate at a position opposing the image reading device;
   a first reading pattern mark provided on the document holding member at a first position opposing the surface of the reading glass plate;
   a second reading pattern mark provided on the document holding member at a second position opposing the surface of the reading glass plate, wherein the second position is different than the first position, and the first reading pattern mark comprises a first form and the second reading pattern mark comprises a second form which is different than the first form, wherein the first reading pattern mark has a first length and the second reading pattern mark has a second length, and each of the first length and the second length is greater than a width of each of the documents; and
   a control device configured to determine the width of each of the documents by sensing a first boundary of a left side edge of each of the documents and a second boundary of a right side edge of each of the documents with respect to the first reading pattern mark and the second reading pattern mark in the primary scanning direction when each of the documents passes over the first position and the second position, wherein the first reading pattern mark and the second reading pattern mark are arranged in an alternating pattern along the primary scanning direction.

2. The document reading apparatus of claim 1, wherein the image reading device is configured to move and to pick up images of the first reading pattern mark or the second reading pattern mark and predetermined portions of the documents when the predetermined portions of the documents from a leading edge along the feeding direction reach the first reading pattern mark and the second reading pattern mark, respectively.

\* \* \* \* \*